United States Patent [19]

Buisson

[11] 4,106,398

[45] Aug. 15, 1978

[54] METHOD AND APPARATUS FOR THE TRANSVERSE FOLDING OF A CONTINUOUS TUBULAR SLEEVE

[76] Inventor: Marcel Buisson, 3 Place des Halles, Chartres, France, 28000

[21] Appl. No.: 745,563

[22] Filed: Nov. 29, 1976

[30] Foreign Application Priority Data

Mar. 23, 1976 [FR] France .................................. 76 08307

[51] Int. Cl.² .............................................. B31D 5/04
[52] U.S. Cl. ................................................. 93/84 TW
[58] Field of Search ............. 93/84 TW, 84 R, 1 WZ, 93/1 R, 60; 53/197

[56] References Cited

U.S. PATENT DOCUMENTS

| 2,696,768 | 12/1954 | Mickey et al. | 93/84 TW X |
| 3,412,523 | 11/1968 | Raymond et al. | 53/197 |
| 3,529,401 | 9/1970 | Sartore et al. | 53/197 |
| 3,868,895 | 3/1975 | Hart et al. | 93/84 TW |

*Primary Examiner*—James F. Coan
*Attorney, Agent, or Firm*—McAulay, Fields, Fisher & Goldstein

[57] ABSTRACT

A method and apparatus for transversely folding a continuous tubular sleeve onto a mandrel are disclosed. The sleeve of thermoplastic material is fed onto a diametrically collapsible mandrel and folded into concentric layers from one end of the mandrel toward the other until the desired number of concentric layers are formed.

41 Claims, 20 Drawing Figures

METHOD AND APPARATUS FOR THE TRANSVERSE FOLDING OF A CONTINUOUS TUBULAR SLEEVE

There are numerous cases in which it is necessary to package products in bags, which are produced one by one from a continuous tubular sleeve, generally of a thermo-weldable synthetic plastics material.

To enable the products to be introduced, it is necessary, either to open the tube at the side, or to form the tube around a mandrel, through the interior of which mandrel the products are conducted.

In the latter case, a great length of tube, folded onto itself in the manner of an accordion or chinese lantern, is disposed upon the mandrel.

This method proves to be not very effective, even with a very thin tube, because it is not possible to exceed a certain minimum, which is the result of totalling up all the successive thicknesses along the mandrel.

In order to overcome this disadvantage, the sleeve is disposed upon a mandrel by folding it transversely towards one end of the mandrel and then towards the other end, in order to obtain concentric layers.

This method in effect makes it possible to multiply by a factor of two at least, the total length of sleeve which can be placed upon a mandrel, by comparison with folding in the fashion of an accordion.

The present invention relates to a method and to a device enabling portions of tube of great length to be made up, which are folded transversely as indicated above.

The invention will be better understood from the detailed description given below, with reference to the attached drawing.

The description and the drawing are of course only given as an indicative example and in a non-limiting context.

The tube which is to be folded is traditionally present in the form of a roll. The tubular sleeve is thus "closed" that is to say it is folded longitudinally.

The first operation of the process according to this invention consists of "opening" this tube, that is to say to give to its free end a circular or oblong section. The thus opened tube is held, in the vicinity of its end, so that it shall be immobilised. On this side of the end, the tube is gripped at at least two locations, situated symmetrically relative to the virtual centre of the open tube, and the tube is folded back on itself in such a manner that the locations at which it is gripped are brought close to the end. This gripping action should therefore be carried out at a distance from this end which is equal to approximately twice the final desired height.

This having been done, the grip is released and the gripping, folding back, and releasing are commenced in a new cycle and repeated as often as is necessary to obtain the desired number of folds.

When this number has been reached, the tube is cut above the last fold.

Thus there is obtained a portion of tube folded onto itself in a number of concentric layers, which constitutes a stock of unitary packages, which will be formed one by one, in accordance with a known process, by transverse closure at the downstream end, filling, transverse closure of the upstream end and cutting.

In order to do this, the portion of folded tube is placed upon a spout of a machine and the tube is fixed so as to unfold progressively as it is required.

The technique of the prior art consists of disposing the portion of tube upon a mandrel and of placing this mandrel upon the spout. Experience has shown that the mandrel is superfluous and that it is quite easy to handle the portion of tube itself. Thus, its bulk during stocking and transportation is reduced to the absolute minimum since, after it has been prepared as already described above, it is flattened. It is easy to open it again in order to place it upon a filler machine, provided that the precaution is taken of causing the ends of the tube to extend beyond the location at which the transverse folds are situated.

It will be noted that during the making up of the portion of tube, two folds are formed by a single folding back action: a downstream fold at the location at which it is gripped and an upstream fold at the location at which the tube folds back onto itself. During these operations, the tube unreels by itself from the reel, which is supported by its centre so that it is free to rotate.

For carrying out the process just described, it is possible to utilise a device such as that shown in FIGS. 1 to 4.

Figure 1:
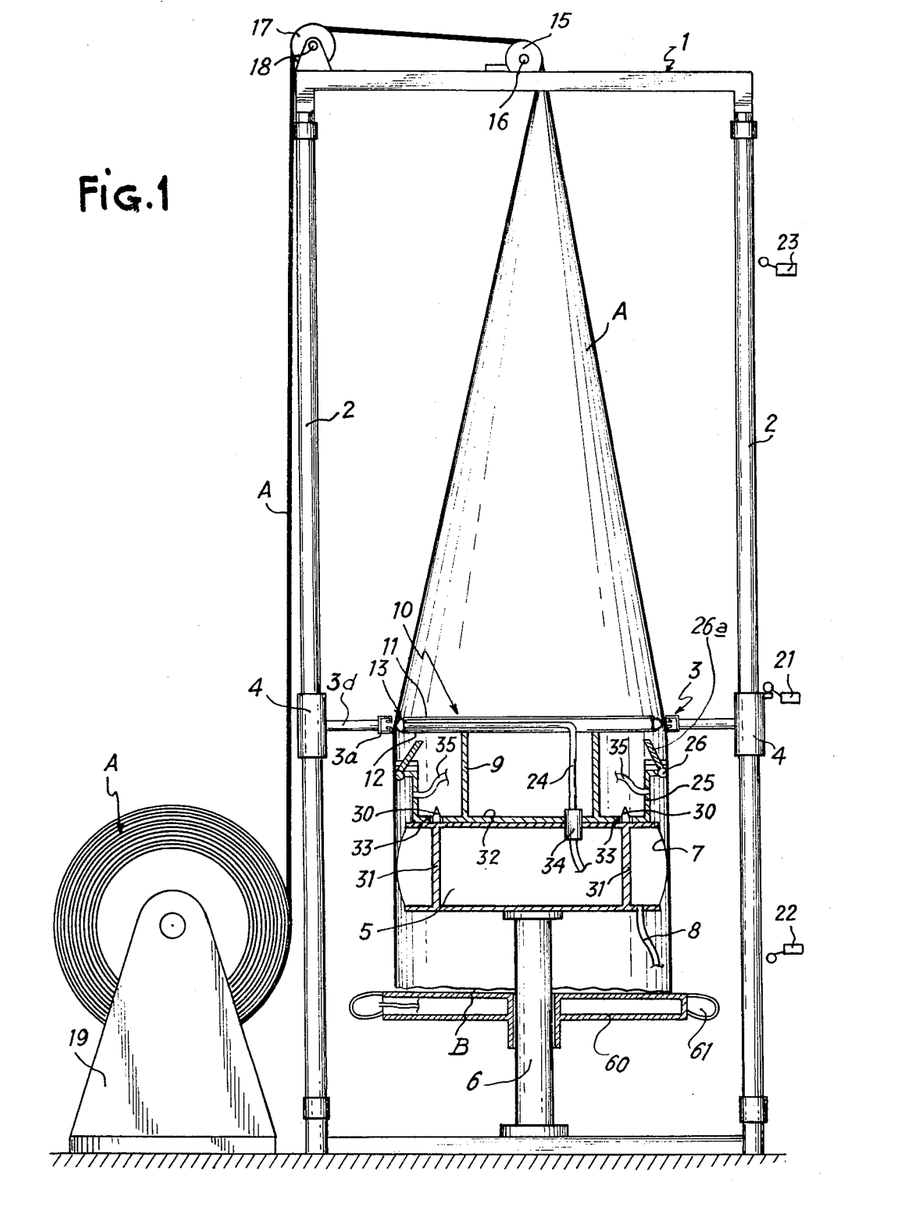
FIG. 1 is a diagrammatic view of a device enabling the method in accordance with this invention to be carried out.

Referring first of all to FIG. 1, it can be seen that the device comprises a fixed frame 1, with which are integrally connected columns 2 serving as vertical guides for a movable annular assembly 3, which will be described in detail below and which can slide along the columns 2 by means of sleeves 4.

At the centre of the frame and in its lower part, there is a mandrel 5, mounted upon a pedestal 6 and comprising an external wall 7, which is flexible in order that it can be radially inflated by the pressure of a fluid conducted to the inside of the mandrel 5 by a pipe 8.

On the mandrel 5, there is mounted a support 9, on which a circular hollow plate 10 is fixed. This plate comprises two rigid, spaced apart discs 11 and 12, connected together at their periphery by a continuous flexible seal 13, which will be described in detail later.

At the centre of the frame and in its upper part, there is a roller 15, mounted to idle upon a shaft 16.

A roller 17, mounted idling upon a shaft 18, is located parallel to the roller 15 at the top of one side of the frame 1. At the foot of this same side, there is a fixed support or cradle 19, intended for receiving a reel of tube A.

The free end B of the tube A is fed around the rollers 17 and 15, then is opened and inserted between the annular assembly 3 and the circular plate 10, then is placed around the mandrel 5 in such a manner that it is situated lower than this mandrel and that the tube A, unreeled from the reel, completely covers the plate 10 and mandrel 5.

Figure 2:
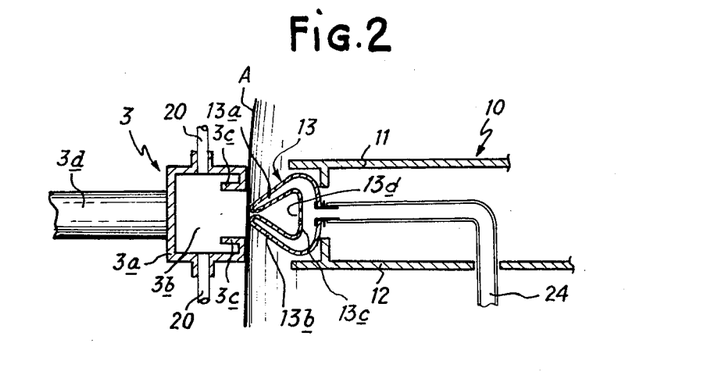
FIGS. 2, 3 and 4 are diagrammatic views showing three phases in the operation of this device.
Figure 3:
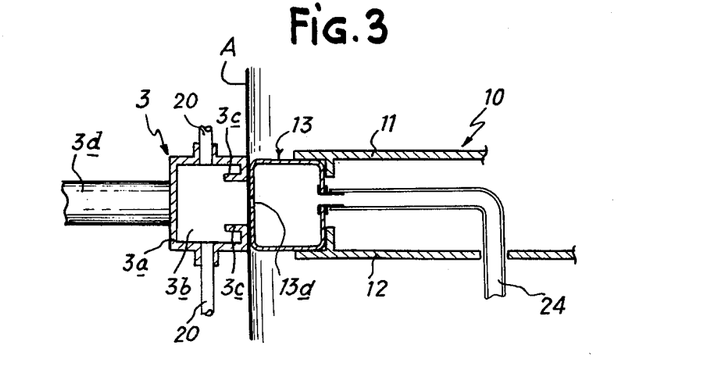
Figure 4:
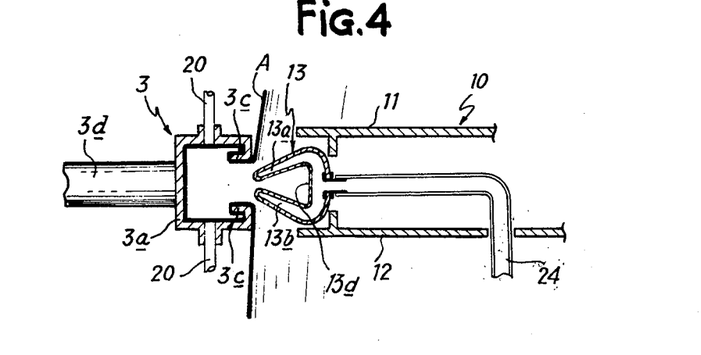

The assembly 3 comprises an annular section 3a, which possesses a continuous throat 3b open towards the centre and bordered by two lips 3c oriented towards the interior of the throat 3b, that is to say towards the periphery of the assembly 3 (FIGS. 2 to 4).

The annular section 3a is rigidly connected to the sleeve 4 by arms 3d and is perforated by a number of pairs of passages, each of which receives the end of flexible pipes 20, leading to a vacuum pump or other suction source (not shown here).

In the vicinity of a column 2, there are situated three contactors 21, 22 and 23, located in such a manner that their movable operating element is situated on the path of the corresponding sleeve 4, in order to be actuated by this sleeve. The function of each of these contactors will be explained later.

The continuous, flexible annular chamber 13 (FIGS. 2 to 4) is fixed to the periphery of the discs 11 and 12 constituting the plate 10.

A pipe 24 passes through the plate 12 and is connected to a nozzle 24a, by which it communicates to the inside of the chamber 13. It is, in addition, connected to a pressurized fluid source, such as an air compressor (not shown).

The chamber 13 constitutes an elastic bellows which, when it is not inflated (FIGS. 2 and 4) has the section of a U, the flanges 13a and 13b of which converge and are hollow.

The web of the U, that is to say the portion of the chamber 13 situtated towards the outside between the flanges 13a and 13b, is perforated by holes 13d, distributed uniformly around the periphery of the seal 13. In total, there may be for example six or eight of these holes; their function will be described in detail below.

The method of operation of the device just described is as follows:

After the tube A has been arranged as shown in FIG. 1, an electrically operated valve (not shown) mounted in the pipe circuit 8 is opened to establish a pressure inside the mandrel 5, so that the flexible wall 7 dilates outwards and, by friction, arrests the tube A in the vicinity of its end B. At this instant, an electrically operated valve (not shown) incorporated in the pipe circuit 24 is opened, to establish an air pressure in the chamber 13. The effect of this pressure is to deform this chamber 13, which thus presses against the exterior of the lips 3c, pressing the tube A against these lips (FIG. 3).

At this instant, an electrically operated valve (not shown) incorporated in the pipes 20 is opened, to produce a vacuum in the throat 3b. When this vacuum reaches a predetermined value, a detector (or "vacuostat") acts upon the electrically operated valve of the pipe 24 to cut out the chamber 13 which then becomes deflated. It is also possible, preferably, to create a depressurization in this chamber as a result of which rapid and reliable shrinkage of the chamber 13 is assured. This depressurization acts in spite of the holes 13d since the flanges 13a and 13b, as they come together, seal off the space remaining between them from the exterior, this space becoming closed and the depressurization acting in it also.

These same holes 13d serve for properly applying the tube A onto the lips 3c when the chamber 13 is still pressurised.

Figure 5:
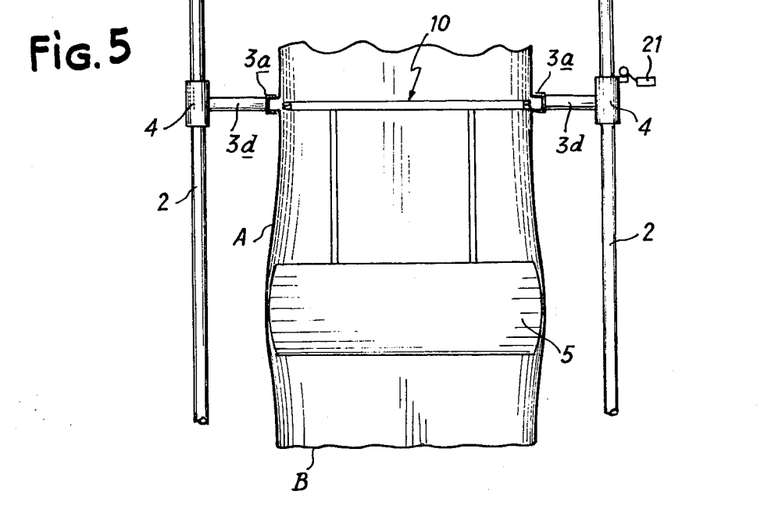
FIGS. 5 and 6 show diagrammatically the forming of the transverse folds of a tube in accordance with this invention.

The vacuum created in the throat 3b sucks the tube A, which is applied forcefully into this throat 3b (FIG. 4), where it is in addition mechanically braked by the lips 3c. The tube A thus remains firmly held by the assembly 3 and totally independent of the plate 10 (FIG. 5).

A mechanism, itself of known type and not shown here, causes the assembly 3 to descend along the columns 2 until the sleeve 4 meets the contactor 22. This contactor causes the electrically operated valve of the pipes 20 to close and these pipes to be connected to atmosphere, in order to cancel out the depressurisation existing in them and to release the tube A which, as a result of the movement of the assembly 3, has been folded transversely along folds C and D (FIG. 6).

Figure 6:
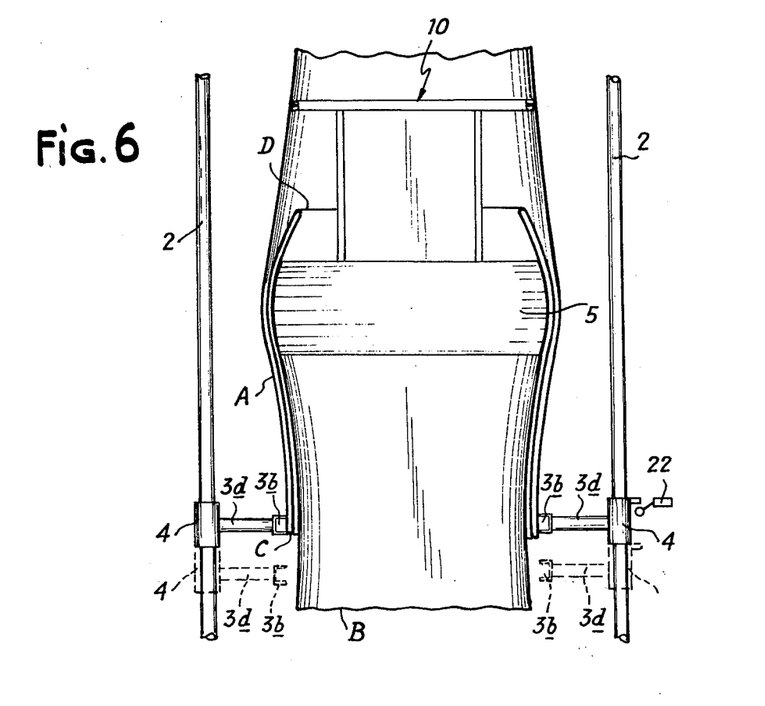

The contactor 22 also acts, with a predetermined delay, upon the mechanism which moves the assembly 3, so that the latter shall not be stopped until after the tube has been released and after the position shown in dotted lines in FIG. 6 has been attained, which has the effect of promoting separation of the tube A from the throat 3b.

The same contactor 22 acts upon the mechanism for moving the assembly 3, so that the latter shall return to its initial position, in which it is stopped by the action, upon this mechanism, of the contactor 21, actuated by the sleeve 4. The cycle is repeated as many times as necessary in order to obtain the desired number of folds.

In order to increase the number of folds, it it possible to use a mechanism of any known type, which acts progressively upon the valve of the pipe 8, in order that the pressure inside the mandrel 5 shall decrease and allow the wall 7 to contract progressively as the quantity of folds increases. In this way, the external diameter of the mandrel 5 is reduced, while still maintaining the pressure upon the tube A, to hold it still.

When the desired number of folds has been reached, the operations are stopped and the device is held in its initial position, which is that shown in FIG. 1. At this instant, the tube should be cut above the mandrel 5.

To do this, provision has been made here upon the support 9, of a peripheral ring 25, which carries upon its upper, outer edge a toroidal duct 26, cut by a continuous slot along its outer generator.

This slot serves as a guide for a cutting blade, with which the tube is cut by hand.

It is of course possible to make this operation mechanical and automatic. One solution consists of placing, in the duct 26, a piston integral with a folding-away radial blade. Compressed air is introduced at a point in the duct 26 when it is desired to cut the tube. The air causes the blade to engage in the slot and propels the piston which, after it has made one complete revolution in the duct 26, is brought to a stop by an abutment. The blade has then completely cut through the tube A and re-adopts its folded-away position.

In order to facilitate the removal of the folded piece of tube, the group of members situated above the mandrel 5 is made movable. This is achieved in the following manner:

The upper, plane and rigid face of the mandrel 5 is equipped with conical studs 30, situated above spacers 31. The support 9 comprises a base-plate 32, perforated by holes 33 distributed so that they correspond exactly with the studs 30. In addition, the pipe 24 is rigid and co-operates with a socket connection 34, so that it can be introduced into an removed from the latter by a simple vertical movement. It is fitted with a flap valve, biased towards the closed position and kept in the open position when the pipe 24 is fitted into the connection 25. Thus, when the pipe is removed from the socket, the valve is closed and the fluid pressure is maintained in the seal 13.

In order to remove the piece of tube folded and cut as described above, the electrically operated valves are actuated to cause the tube to be gripped in accordance with FIGS. 2 to 4. Then the mechanism for moving the assembly 3 is actuated to produce an upward movement, while maintaining the grip on the tube in such a way that the movable assembly 3 is integral with the plate 10 and thus with the support 9, the pipe 24, and the ring 25. The whole of this assembly is raised (pipe 24 coming out of socket connection 25, the valve closing and the pressure in the seal 13 being maintained) until the sleeve 4 reaches the contactor 23, which causes the ascending motion to stop.

This movement can also be produced by means of an independent mechanism, which could for example be connected detachably to the base-plate 32, or to any other component integral with the plate 10.

When the top of the mandrel 5 has been completely released and deflated, the folded piece of tube is pulled off, after which the raised assembly is lowered until the position of FIG. 1 is reached, to re-commence the folding cycle, this position being attained by stopping of the movement mechanism when the sleeve 4 meets the contactor 21.

During this lowering movement, the only precaution to be adopted is to ensure that the end of the sleeve correctly covers the mandrel 5.

The support 9 automatically re-adopts its position, as a result of the studs 30, which penetrate into the holes 33. The pipe 24 engages in the socket 34. The valve opens in order to re-establish connection with the air compressor. The depressurisation in the throat 3b is maintained and the compression in the chamber 13 is eliminated so that the device is again in the situation of FIG. 4, ready for another cycle.

The duct 26 can be integral with a wall 26a of truncated cone shape situated above it, which serves for guiding the tube A when it is caused to descend, to ensure that it properly covers the mandrel 5 without encountering any obstacle.

At the time when the folds are formed (FIG. 6), air can become trapped above the lower folds C, which has the effect of "swelling" the successive layers of tube and, consequently, of increasing the external diameter. This is a disadvantage which tends to limit the quantity of possible layers.

In order to counteract this disadvantage, provision is made in the ring 25 of a certain number of holes, to each of which there leads a tube 35, connected to a suction source (not shown). Thus, the trapped air is evacuated and the tube is flattened against the preceding layer. Two favourable effects are obtained, these being the reduction of the diameter and the increase in the mechanical braking action of the layers one upon another, thus resulting in an improved action of the mandrel and in a perfect formation of the upper folds D.

It should be noted that the upper folds D form above the mandrel 5, so that the tube tends to incline towards the centre at this location (FIG. 6) completely clear of the passage for the next layer, gripped in the throat 3b.

Moreover, the introduction of the tube into the throat 3b can be carried out in a manner somewhat different from that just described.

Figure 7:
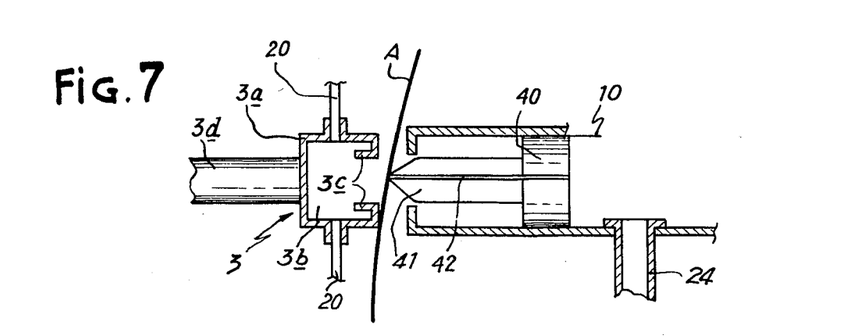
FIGS. 7 and 8 are diagrammatic views of two variants of embodiment.
Figure 8:
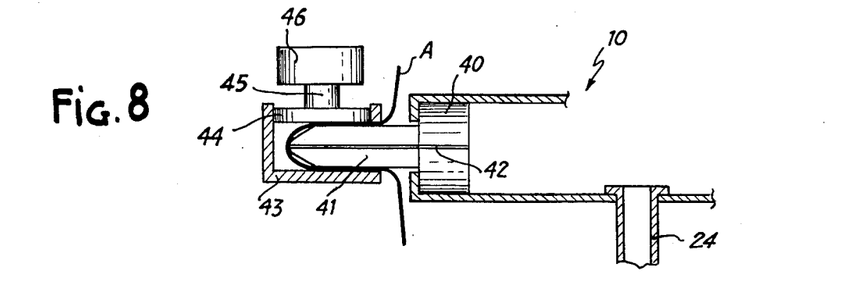

Thus, referring to FIGS. 7 and 8, it can be seen that the chamber 13 can be replaced by a series of radial pistons 40 operated by compressed air in cylinders, which likewise are radial, and each equipped with a finger 41, which can extend as far as the interior of the throat 3b. Each piston 40 and each finger 41 are traversed by an axial duct 42 which opens out at the tip of the finger 41 and which conducts a fraction of the compressed air opposite to the tube A, so as to promote the return of the fingers 41 in accordance with the same effect as described above where it was obtained by the holes 13d.

With the variant of FIG. 7, the gripping of the tube A is produced, as before, by suction in the throat 3b.

With the variant of FIG. 8, the gripping of the tube A is produced mechanically. An annular channel-section 43 is open towards the inside so as to receive the tube A and comprises upper apertures, into each of which a piston 44, integral with a plunger 45 of an electromagnet 46 can penetrate. At the instant at which the finger 41 retracts, after having introduced the tube A into the channel-section 43, the electromagnets 46 are energised, so as to move the plungers 45 and cause the pistons 44 to grip the tube A. This is facilitated, firstly by the flow of air coming from the ducts 42 and secondly by the tapered shape of the end of the fingers 41.

The electromagnets 46 can, of course, be replaced by any other equivalent mechanical means such as pressurised fluid jacks.

According to one variant, the channel-section 43 is replaced by two superimposed rings, one of which is equipped with peripheral notches. The tube A is engaged between the two rings and the pressure elements (jacks or electromagnets) are situated opposite to the notches in such a way that they grip the tube between themselves and the continuous ring.

According to the form of embodiment just described, the forming of the folds is intermittent, that is to say the movable assembly 3 forms two folds (C and D) at each descending stroke but does not form a fold when it ascends.

It is possible to increase the output of the device considerably by substituting a continuous mechanism for this intermittent mechanism.

Figure 9:
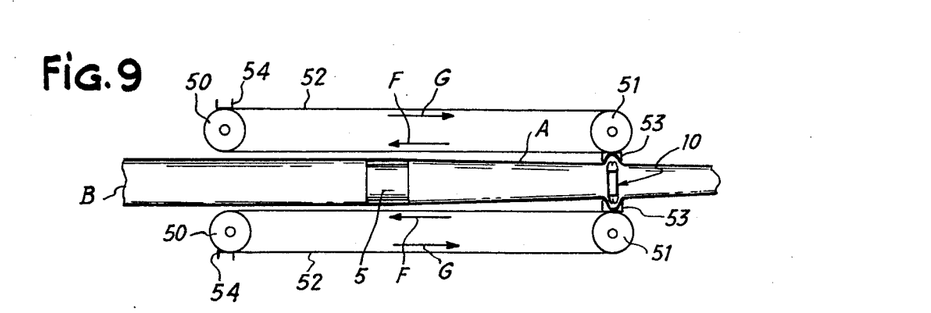
FIG. 9 is a diagrammatic side view of one particular form of embodiment of a device according to this invention.
Figure 10:
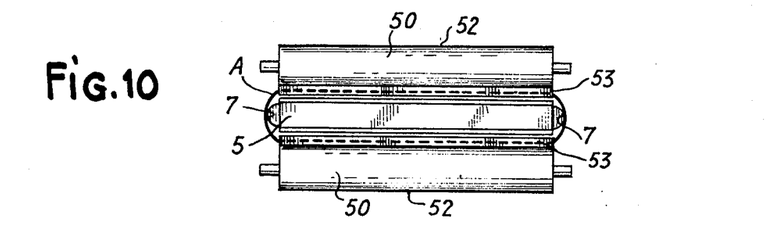
FIG. 10 is a diagrammatic front view of the same device as that shown in FIG. 9.

Thus, referring now to FIGS. 9 and 10, it is possible to see a device, the fundamental principle of which is the same as the foregoing, but which operates continuously and which is mounted horizontally, as may be of advantage in practice.

For this purpose, it is more advantageous to give to the open tube A an oblong perimeter (FIG. 10), which implies a corresponding shape for all the members situated inside this tube.

Thus, the plate 10 is oblong but can be formed in its function as described above. The mandrel 5 is also oblong and its elastic wall 7 is discontinuous in the sense that it does not form a complete circuit of the lining, as before, but is situated solely on the two shorter sides.

The movable assembly comprises, opposite to each of the longer sides, two rollers 50 and 51 on which there is placed a flexible element, closed on itself, such as an endless belt, band, chains, cables or the like. One of the rollers of each set is rotationally driven, so that the endless belts 52 shall move in the direction of the arrows F and G.

Each endless belt 52 possesses two rectilinear, transverse chambers or cavities 53 and 54, which are situated symmetrically and which each constitute a device for gripping the tube A, of the type of the throat 3b or channel 43 but which, of course, must be closed at their two ends.

The method of functioning of this device is as follows:

In the position of FIG. 9, the tube A has been positioned, covering the mandrel 5, which is inflated. As before, the tube A is introduced and gripped in the two opposite chambers 53. The endless belts 52 are started up and the first folds form as already described. When the chambers 53 arrive at the location at which the downstream fold should be situated (corresponding to fold C of FIG. 6), the depressurisation which exists in the chambers 53 is broken, so that the tube A is released and the chambers 53 continue their movement. At this instant, the chambers 54 have arrived at the location of the chambers 53, that is to say upstream of the mandrel 5, and they receive the tube A by the action of the members of the plate 10. They entrain the tube A for new folds, while the chambers 53 arrive in their turn and thus after them.

It can be seen that there is no idling stroke and that the production of the device is doubled, by comparison with that of the device of FIGS. 1 to 6.

Whatever the form of embodiment selected (the type of FIG. 1 or of FIG. 9), it is possible to increase the number of folds of a given portion of tube, regardless also of the thickness of the tube and of the diameter of the mandrel.

The process consists of forming a first portion of folded tube, then of removing this in the downstream direction without cutting the tube between them, and then of cutting the tube beyond the last portion, then of engaging them one onto the other.

In practice, the connected together portions can be rapidly engaged one onto the other by hand, since it is necessary for the different portions to be held in a flexible manner.

The device just described, regardless of the variant chosen, comprises means of any known type for ensuring the synchronisation and timing of the various constituent members such as the electrically operated valves, compressors, pumps, contactors, motors etc., in order that the device shall function automatically.

The mandrel 5 may consist, as described above, of a single chamber bounded by a flexible wall. It may also comprise one or more toroidal chambers in the manner of the air chambers of pneumatic tyres.

The external wall of this chamber or chambers may receive external elements, which may be anti-slip, to obtain a plane external surface and/or to increase the braking effect upon the tube.

When the tube is thick, the successive layers slide easily one upon the other on account of their weight and it is difficult to hold them, even with a high radial pressure of the mandrel 5.

It is then possible to use a pedestal 60 (FIG. 1), preferably equipped with an inflatable toroidal chamber 61 so that the folds C can rest on it, which prevents them from slipping. Exerience shows that the use of this pedestal even permits the mandrel 5 to be deflated, and it may be simply rigid.

At the time of positioning the tube A, its end B, instead of hanging, is folded towards the centre so that it shall not interfere with the forming of the folds.

Referring to the drawing (FIGS. 11 to 16) it can be seen that the grip comprises an internal fixed part and an external movable part 3, the first constituting the mechanism for the introduction of the tube while the second constitutes the grip proper.

According to the present invention, the internal fixed part is composed of a circular plate 100, on which there are provided functional members described below. As has already been stated above, the top flat and rigid, of the mandrel 5 is equipped with conical studs 30. The supports 9 are integral with the plate 100 and with a base-plate 32 perforated by holes 33 corresponding to the studs 30.

The plate 100 receives four jacks 101, oriented orthogonally and supplied with pressurised fluid by extensions of the pipe 24.

The rod 102 of each jack 101 is connected to a plate 103, having the shape of a circular arc, so that the four plates 103 are inscribed inside the circle formed by the periphery of the plate 100. For reasons of size, each plate is notched with a cut-out portion 104, at the base of which the fixing for the rod 102 is situated.

On either side of the axis of the jacks there are situated rods 105, fixed in pairs to each plate 103 and each engaged in a guide 106 fixed to the plate 100.

When the jacks 101 are supplied with pressurised fluid to extend them, the four plates 103 are pushed beyond the edge of the plate 100 by the rods 102, being held and guided by the rods 105. The plates then penetrate into the further grip.

When the jacks 101 are supplied with the pressurised fluid causing them to retract, the four plates 103 are brought back to their starting position.

The grip proper 3 is constituted of a toroidal ring 3a, which possesses a continuous, inwardly open throat 3b. Inside the ring 3a there are situated two inflatable toroidal capacities 3e, facing each other. They are fixed to the ring by means of inextensible rings 3f, which band them individually. Thus, when the capacities 3e are supplied with pressurised fluid (by any known means, not shown) they press one against the other except at the rings 3f. For its part, each plate 103 is equipped with peripheral notches 107 which bound pushers 108. The rings 3f and the pushers 108 are distributed uniformly and are opposite one to another.

The method of functioning of this device is as follows:

The tube A is engaged in the circular space which remains between the edge of the plate 100 and the ring 3 until its free end B reaches the top of the pedestal 60. The operating cycle then commences (automatically or otherwise) by supplying the pressurised fluid into the jacks 101. The tube A receives the action of the pushers 108 as a result of the displacement of the plates 103 and is then engaged by the throat 3b in the base of the ring 3a. The pressure is supplied into the capacities 3e, which bear one against the other, gripping the tube A except at the rings 3f, opposite to which the pushers 108 are situated. As a result of the alternating of the slots 107 and of the pushers 108 and of the corresponding alternating of the gripping zones and of the rings 3f (FIG. 16), the tube A is strongly gripped (and therefore held in place) without however preventing the return of the plates 103, which return is produced by reversing the pressure in the jacks 101.

As soon as the plates 103 have returned into position, the mechanism for lowering the grip 3 is brought into action, as already described in detail above.

The actuating of this mechanism must be rendered absolutely impossible, if the plates 103 are not completely withdrawn within the circumference of the plate 100. This is the reason why the latter possesses four safety contactors 109, the sensitive member of which is on the path of the plates 103 when these plates are in the retracted position. The lowering mechanism for the grip 3 is released by the contactors 109 only when this condition is satisfied.

The raising of the plate 100, of the supports 9 and of the base-plate 32 is produced in the following manner:

The arms 3d, which connect the ring 3a to the sleeves 4, each carry a jack 200, the rod 201 of which is oriented towards the centre of the device and is at the level of the underside of the plate 100.

Figure 11:
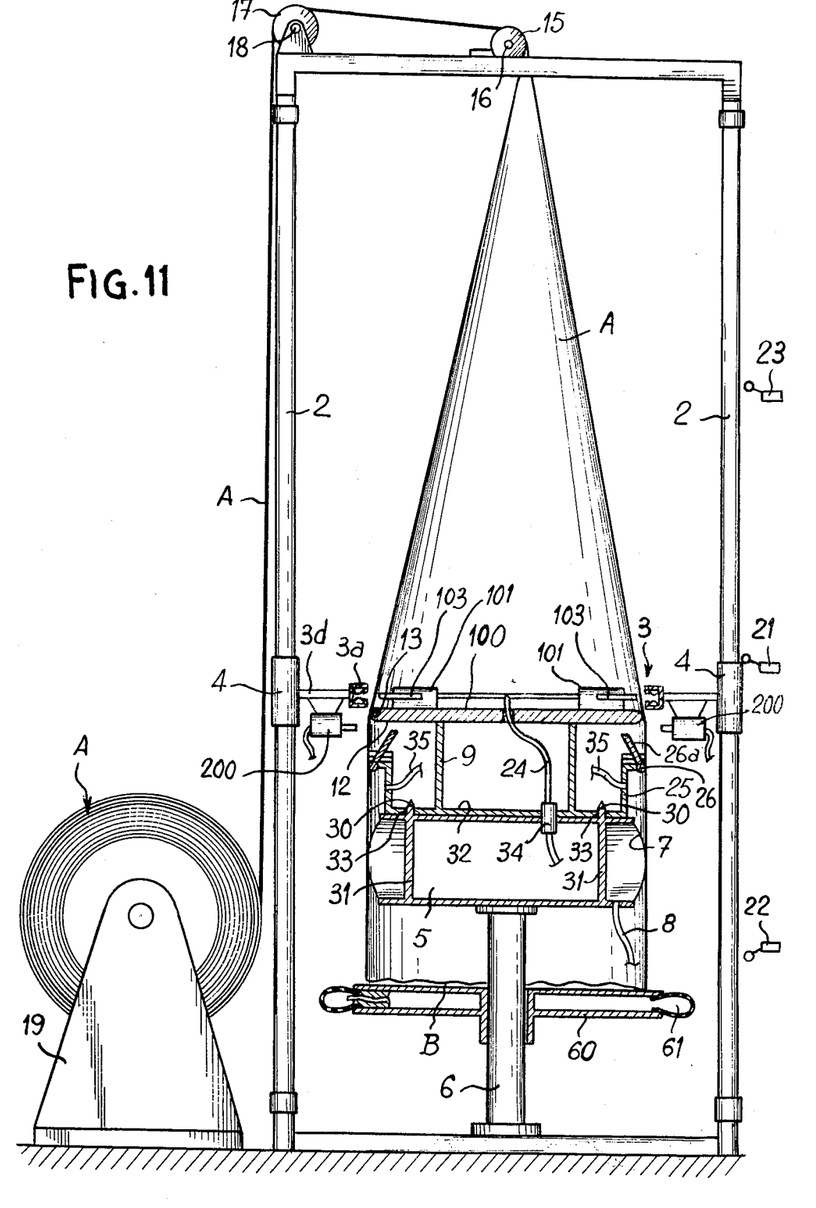
FIG. 11 is a diagrammatic overall view of a variant of the device in accordance with the present invention.
Figure 12:
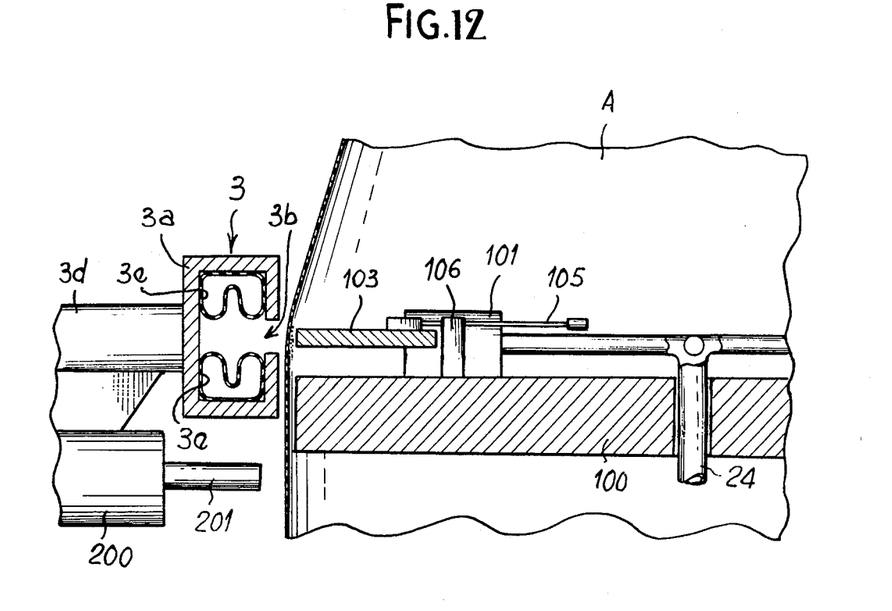
FIGS. 12 and 13 are diagrammatic partial views showing the introduction of the tube into the movable grip for forming the folds in the variant of FIG. 11.
Figure 13:
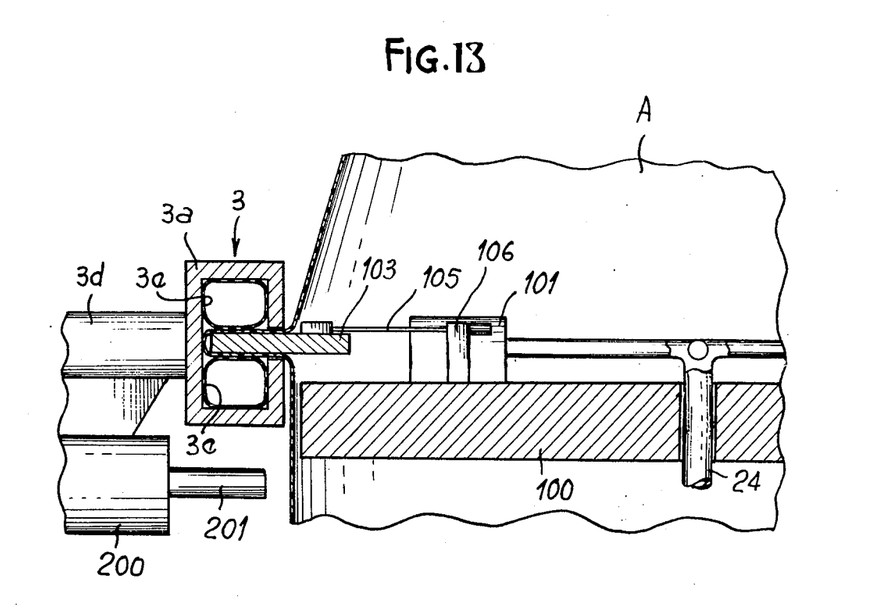
Figure 14:
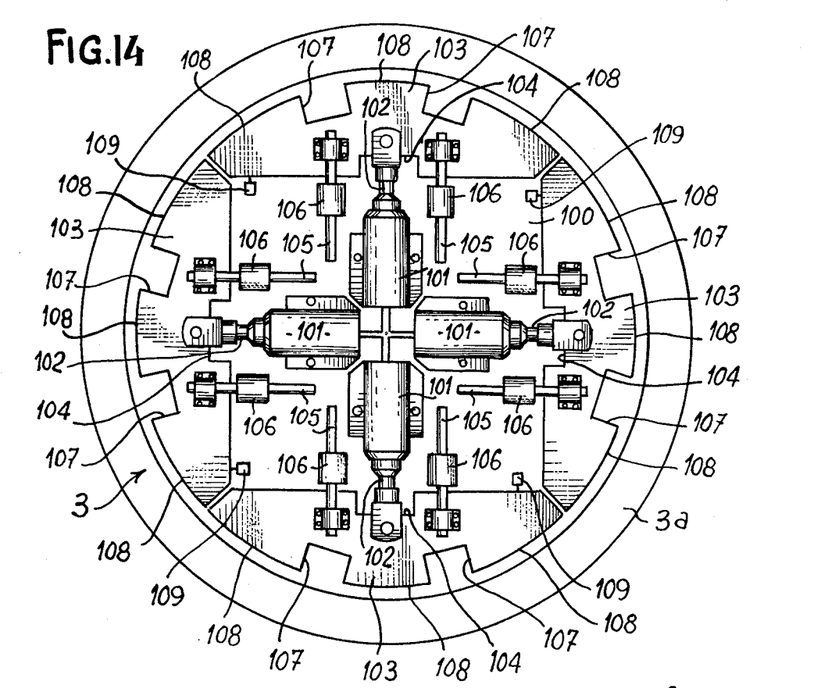
FIG. 14 is a diagrammatic plan view showing the central portion opposite to the movable grip.
Figure 15:
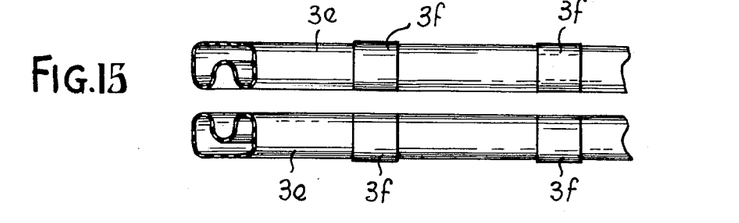
FIGS. 15 and 16 are diagrammatic views showing the two positions, respectively open position and closed position, of the grip, that is to say of the inflatable capacities constituting this grip.
Figure 16:
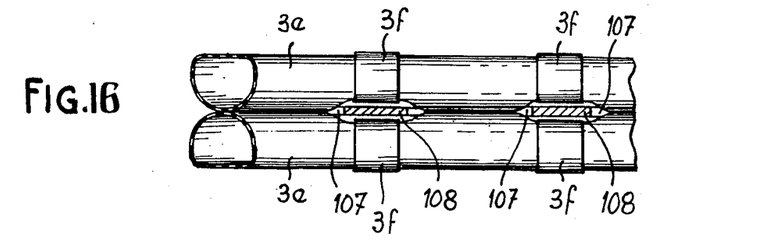
Figure 17:
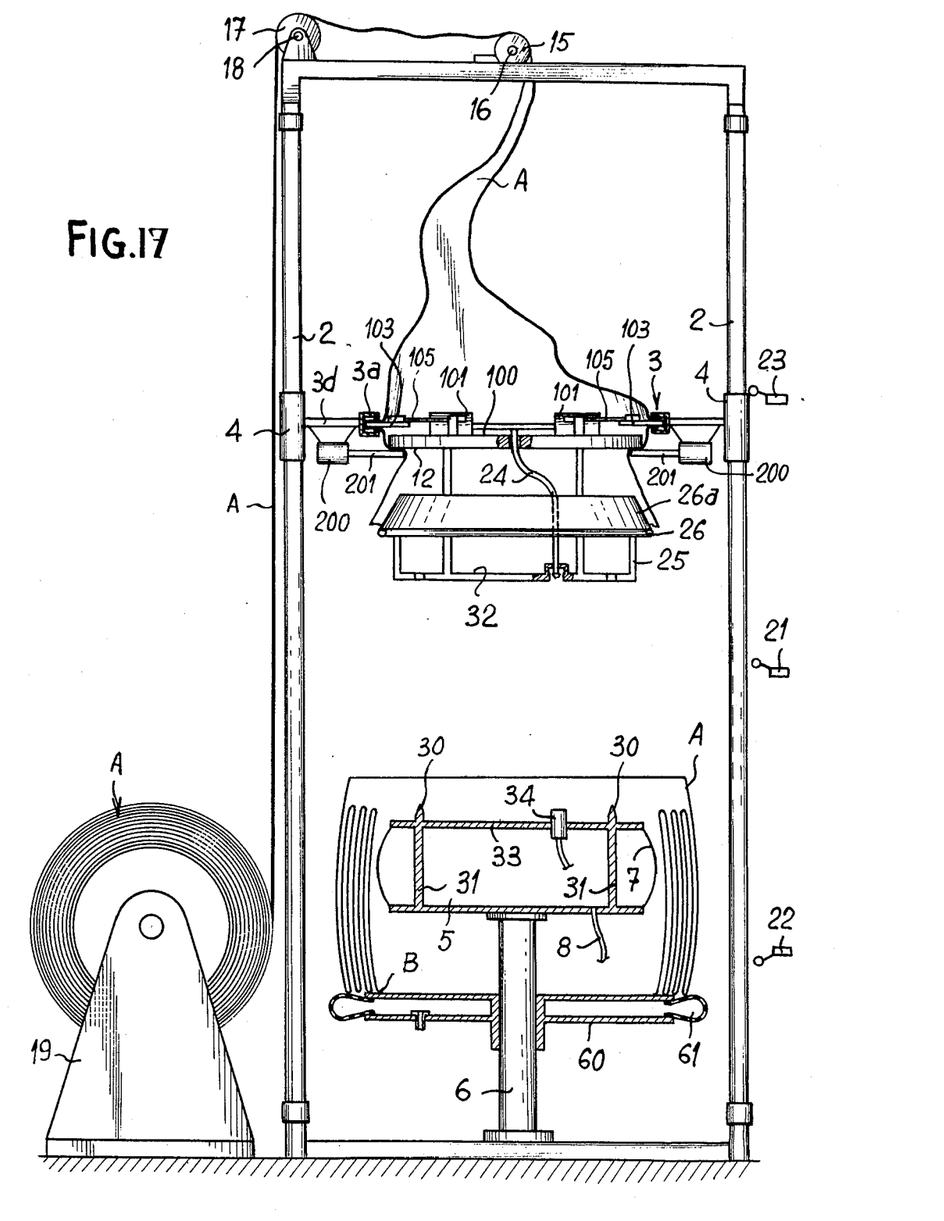
FIG. 17 is a diagrammatic overall view of a device according to the present invention, shown in the withdrawn position of the finished portion of folded tube.

When the desired number of folds has been obtained, the grip 3 is stopped opposite to the edge of the plates 103 under the influence of the contactor 21 (FIG. 11). At this instant, the tube is cut (automatically or otherwise) just below the plate 100. The pressurised fluid is supplied into the jacks 200, so that their rods 201 are situated beneath the plate 100. The actuating mechanism for the grip 3 is started up in the lifting direction, so that the plate 100 is entrained upwards by the rods 201. As described above, the assembly comprising the supports 9, base-plate 32 and pipe 24 (and also the other elements which are integral with these components) is raised until the sleeves 4 meet the contactors 23 (FIG. 17).

It is now possible to pull off the portion of folded tube, by causing it to pass over the mandrel 5. When this has been done, the raised assembly is lowered until the base-plate 32 rests upon the top of the mandrel 5.

The pressure in the jacks 200 is reversed until the rods 201 are retracted. The tube A has remained engaged around the plate 100 and it is only necessary to lower it to the pedestal 60 and the cycle recommences.

Figure 18:
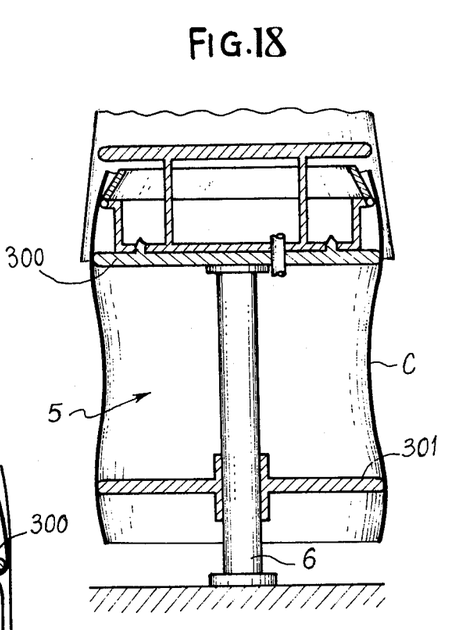
FIGS. 18, 19 and 20 show three basic phases of the folding of a tube according to one improvement of the device.
Figure 19:
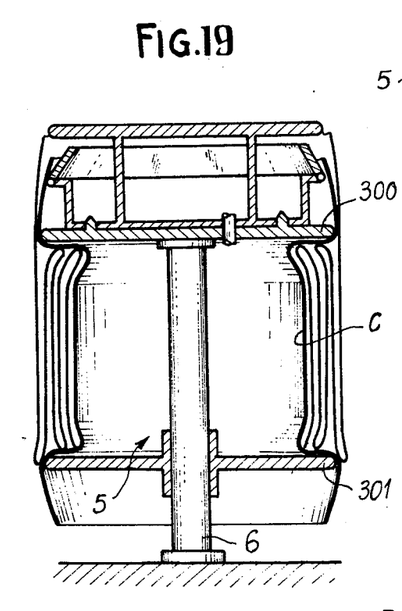
Figure 20:
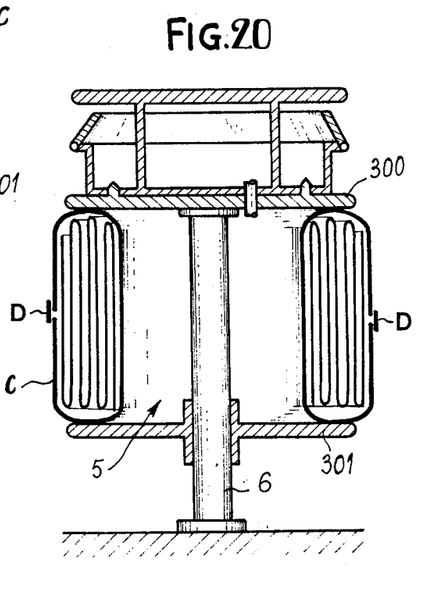

Referring now to FIGS. 18 to 20, it can be seen that the device comprises a mandrel 5, which does not possess the wall 7. The mandrel 5 is composed of two circular horizontal plates fixed to the pedestal 6.

According to the form of embodiment described earlier, the tube A is held, in the vicinity of the middle of its height as measured between the grip at the top and the pedestal 60 at the bottom, because the wall 7 acts by its roundness, which it acquires by inflation.

In the present case, by contrast, it is held along two superimposed circles close to the ends of the tube measured as above.

In fact, the plates 300 and 301 have a diameter slightly in excess of that of the open tube, so as to create friction, which holds the tube.

Apart from the simplification in the construction of the device, this arrangement also results in a possible method of packaging the portion of folded tube, as will now be described.

It can be seen in FIG. 18 that a single portion of tube C is available, which remains stretched by friction with the plates 300 and 301.

The distance between the two plates is adjustable by movement and fixing of the plate 301 on the pedestal 6. This distance is selected so that the upper and lower folds form substantially at the plates 300 and 301.

The length of the portion C is substantially equal to twice the height of the portion of folded tube.

Starting from the position shown in FIG. 18, the tube A is folded as already described. Thus, concentric successive layers of tube A are formed. Progressively as these layers are formed, they deform at their ends and enter progressively into the space comprised between the two plates 300 and 301, taking with them the portion C (FIG. 19). At the plates 300 and 301, there is still therefore only the thickness of the portion C and one thickness of tube A in the course of being folded.

When the desired number of folds has been reached, the tube A is cut (as already described) above the upper end of the portion C, then the ends of the portion C are folded respectively downwards and upwards so as completely to envelop the folded portion of tube, and then the two ends are joined together by means of an adhesive strip D, for instance (FIG. 20) and then the whole assembly is released.

Thus an easily handled article is obtained without the risk of the folds spreading out. The presence of the strip D is, moreover, a practical reference point for the easy positioning onto a user machine for the packaging thus created.

This facility of use is still further increased by choosing different colours for the tube A, the portion C and/or the strip D.

The invention is not limited to the forms of embodiment described and shown but it encompasses, by contrast, all possible variants.

In particular, it can be applied equally well to the case where the axis of the device is vertical as to the case where this axis is horizontal or oblique.

I claim:

1. A method of folding a continuous length of tubular material to form a package comprising a plurality of concentric layers juxtaposed concentrically adjacent to each other, comprising the steps of:
    holding open the tubular material in the vicinity of a free end thereof;
    gripping the tubular material at a distance from the free end at least equal to twice the length of one of the juxtaposed concentric layers;
    moving the gripped portion of the tubular material into juxtaposition adjacent to the free end of the tubular material and folding the tubular material over itself to form two concentric layers one overlying the other from the material between the free end and the gripped portion;
    releasing the gripped portion; and,
    cutting the folded tubular material to form the package of concentric layers juxtaposed concentrically adjacent to each other.

2. The method according to claim 1, comprising forming at least two successive assemblies of folds without cutting the tubular material between them, comprising the steps of:
    repeating said gripping step after the release of said gripped portion including gripping another portion of the tubular material at a distance from the free end at a distance equal to the length of the just formed concentric layers superimposed concentrically adjacent to each other;

moving the other gripped portion into juxtaposition with the first gripped portion while folding the tubular material over itself to form two additional concentric layers which concentrically overlie the first two concentric layers and are engaged therewith; and, cutting the tubular material beyond the last assembly.

3. The method according to claim 1, comprising the steps of:

providing a folding portion of the tubular material beyond the portion held open;

cutting the tubular material to leave another folding portion beyond the last-formed concentric layer;

folding over the two folding portions towards each other over the external face of the last-formed concentric layer; and, joining the ends of the two folding portions together at least over a portion of their length.

4. Article produced by carrying out the method according to claim 1, comprising a portion of folded tube and an enveloping portion.

5. A method of folding a continuous length of tubular material to form a package comprising a plurality of concentric layers superimposed concentrically adjacent to each other, comprising the steps of:

holding open the tubular material in the vicinity of a free end thereof;

gripping the tubular material at a distance from the free end at least equal to twice the length of one of the superimposed concentric layers;

moving the gripped portion of the tubular material into juxtaposition adjacent to the free end of the tubular material and folding the tubular material over itself to form two concentric layers one overlying the other from the material between the free end and the gripped portion;

releasing the gripped portion;

repeating said gripping step after the release of said gripped portion including gripping another portion of the tubular material at a distance from the free end at a distance equal to the length of the just formed concentric layers superimposed concentrically adjacent to each other;

moving the other gripped portion into juxtaposition with the first gripped portion while folding the tubular material over itself to form two additional concentric layers which concentrically overlie the first two concentric layers and are engaged therewith; and, cutting the folded tubular material to form the package of concentric layers superimposed concentrically adjacent to each other.

6. Apparatus for folding a tube having a longitudinal axis and being formed of a continuous length of tubular material to form a package comprising a plurality of concentric layers juxtaposed axially concentrically adjacent to each other, comprising:

holding means for engagement with the tubular material in the vicinity of a free end thereof, said holding means including a mandrel for engagement with the interior of the tubular material, said mandrel including control means to permit the extenal diameter of the formed package to remain constant and to hold the interior wall of the tubular material in engagement with said mandrel and to release therefrom the interior wall of the tubular material;

gripping means including at least one grip movable parallel to the longitudinal axis between two adjustable positions situated on opposite sides of said mandrel, one of said adjustable positions being above said mandrel and the other of said ajustable positions being below said mandrel in the direction of movement parallel to the longitudinal axis, and means for securing together and separating the tubular material and said grip.

7. Apparatus as set forth in claim 6, wherein said holding means includes:

a truncated cone-shaped wall surmounting said mandrel for positioning therearound the tubular material.

8. Apparatus as set forth in claim 6, wherein:

said mandrel includes a variable diameter perimeter wall; and said control means includes wall extent control means connected with said mandrel to vary the perimetrical extent of said interior wall to decrease the diameter of said interior wall in accordance with an increase in the number of juxtaposed axially concentric layers adjacent to each other.

9. Apparatus as set forth in claim 8, wherein:

said perimeter wall includes a dilatable capacity having a wall of flexible material capable of being dilated perpendicularly to the longitudinal axis and adapted for engagement with the longitudinal axis of the tubular material.

10. Apparatus according to claim 8, wherein said wall extent control means comprises:

a number of elastic capacities which extend over a substantial portion of the length of said mandrel parallel to the axis of the tublar material, and the interior of each capacity being brought into communication with a source of pressurized fluid controlled by a valve.

11. Apparatus according to claim 8, wherein:

said mandrel is hollow, and said perimeter wall comprises a continuous elastic wall, means bringing the interior of said mandrel into communication with a source of pressurized fluid, and a valve to control the pressurized fluid.

12. Apparatus according to claim 11, wherein:

said control means includes adjustable means for the dilatation of said flexible wall.

13. Apparatus according to claim 12, including:

at least one synchoronisation mechanism to control said adjustable means in order that the dilatation of said perimeter wall decreases regularly as a function of the increase in the number of concentric layers formed.

14. Apparatus according to claim 10, wherein:

said control means includes at least one element situated outside the dilatable capacity.

15. Apparatus according to claim 14, wherein:

said perimeter wall includes an outer wall having a non-slip surface.

16. Apparatus according to claim 6, wherein:

said control means comprises movable mechanical members capable of occupying two positions respectively close to and remote from the axis of said mandrel.

17. Apparatus according to claim 16, wherein:

each said movable member comprises an external non-slip surface portion.

18. Apparatus according to claim 6, comprising:
a support perpendicular to the axis of the tubular material and situated downstream of the mandrel so that the downstream concentric layers of the tubular material rest upon said support.

19. Apparatus according to claim 18, wherein:
said support has a variable perimeter, and the support includes an inflatable annular chamber.

20. Apparatus according to claim 6, wherein said gripping means comprises:
a fixed internal portion intended to be situated inside the tubular material, and
a movable external portion intended to be situated outside the tubular material,
said fixed internal portion comprising means for biasing the tubular material towards said movable external portion.

21. Apparatus according to claim 20, wherein said gripping means comprises:
two coaxial annular portions, between which the tubular material is to be engaged,
the internal face of said movable external annular portion comprising at least one throat,
said means for biasing the tubular material towards the external portion are constituted of at least one member capable of occupying a withdrawn concealed position and an active position.

22. Apparatus according to claim 20, wherein:
said means comprised by said fixed internal portion are constituted of an elastic peripheral chamber, the interior of which is brought into communication with a source of pressurized fluid.

23. Apparatus according to claim 22, wherein:
said peripheral chamber has, when at rest, a U-shaped cross-section,
said chamber having flanges which converge towards one another and are hollow, while when pressurized the external portion of the web of the U is biased towards the tip of the flanges so as to be capable of bearing against the edges of the throat of the external annular portion.

24. Apparatus according to claim 23, wherein:
said external portion of said web is perforated with holes.

25. Apparatus according to claim 21, wherein:
said throat of said external annular portion is brought into communication with a suction source,
said throat of said external annular portion comprises at least one external lip.

26. Apparatus according to claim 20, wherein:
said fixed internal portion includes at least one pusher capable of movement in the direction of the movable external portion.

27. Apparatus according to claim 20, wherein:
said movable external portion comprises movable members which can be brought together and moved apart by a motor means.

28. Apparatus according to claim 20, wherein:
said movable external portion comprises at least two members for securing the tubular material, and
at least one flexible element closed onto itself in the form of a loop in engagement with drive pinions, said two securing members being carried by said flexible element,
the path of said flexible element is parallel to the axis of the tubular material over a length equal to twice that which separates two successive transverse concentric layers.

29. Apparatus according to claim 6, comprising:
at least one suction orifice situated between said mandrel and said gripping means in a position for securing of the tubular material,
said orifice being oriented radially so as to suck out the air trapped between the concentric layers of the tubular material and to bias the concentric layers towards the center of the tubular material.

30. Apparatus according to claim 29, comprising:
a peripheral deflector not parallel to the tubular material, and
said suction orifice emerges beneath said deflector.

31. Apparatus according to claim 20, wherein:
said fixed portion of said gripping means is placed in a removable manner upon the mandrel, and
said mandrel includes aligning guides to cooperate with said fixed portion.

32. Apparatus according to claim 6, wherein:
said mandrel and said gripping means have an oblong periphery.

33. Apparatus according to claim 6, wherein:
said mandrel has an oblong periphery, and
said gripping means comprises two opposed segments situated opposite to the long sides of said mandrel.

34. Apparatus according to claim 6, wherein:
said gripping means includes an external movable portion, and
means for biasing the tubular material towards said external portion, and
at least one synchronisation and timing mechanism for controlling said securing means and said grip to ensure the cyclical and automatic functioning of the apparatus.

35. Apparatus according to claim 26, wherein:
each said pusher is constituted of a plate, the external contour of said plate being an arc of a circle;
said external portion having a throat,
said plate being slidably mounted along guides and connected to the rod of a jack, and
the thickness of said plate being less than the width of said throat so that said plate can penetrate into said throat.

36. Apparatus according to claim 27, wherein said movable members each comprise:
a dilatable toroidal capacity,
means positioning said capacities opposite to one another so that when deflated they can leave space between them free and when inflated they can obturate the space between them, and
a source of pressurized fluid to inflate said capacity.

37. Apparatus according to claim 35, including:
uniformly distributed inextensible rings banding each said toroidal capacity so as to oppose the inflating of said toroidal cpacity at said banding;
a plate, each said plate including a pusher portion and being provided with peripheral notches distributed in such a manner that they are on opposite sides of said pusher and situated opposite the zones of said toroidal capacity free of said rings, and
said pusher portions being situated opposite to said rings.

38. Apparatus according to claim 31, including:
sleeves slidable along fixed columns;
arms connecting said movable external portion of said grip to said sleeves;

said arms carrying jacks, the rod of said jacks being in a plane situated just downstream of the fixed internal portion of the grip and being intended to be situated opposite to said fixed internal portion when the jack is supplied with pressurized fluid and when said rod is in an extended position so that the fixed internal part, resting upon the mandrel can be rendered integral with the sliding sleeves.

39. Apparatus for folding a tube having a longitudinal axis and being formed of a continuous length of tubular material to form a package comprising a plurality of concentric layers superimposed axially concentrically adjacent to each other, comprising:

- holding means adapted for engagement with the tubular material in the vicinity of a free end thereof, said holding means including a mandrel having an external variable perimeter wall means adapted for engagement with the interior of the tubular material, and a perimeter wall means extent control means connected with said mandrel to vary the perimetrical extent of said wall means to hold the interior wall of the tubular material in engagement with said mandrel and to release therefrom the interior wall of the tubular material;
- gripping means including at least one grip movable parallel to the longitudinal axis between two adjustable positions situated on opposite sides of said mandrel, and means for securing together and separating the tubular material and said grip.

40. Apparatus for folding a tube having a longitudinal axis and being formed of a continuous length of tubular material to form a package comprising a plurality of concentric layers superimposed axially concentrically adjacent to each other, comprising:

- holding means adapted for engagement with the tubular material in the vicinity of a free end thereof, said holding means including a mandrel for engagement with the tubular material, to vary the perimetrical extent of the inner layers of the concentric layers, to hold the interior wall of the tubular material in engagement with said mandrel, to maintain the external diameter of the outermost concentric layer constant, and to release therefrom the interior wall of the tubular material;
- said mandrel comprising two plates spaced axially apart by a distance substantially equal to the length separating two successive folds forming a pair of concentric layers, one juxtaposed to the other, the diameter of said plates being slightly greater than that of the tube;
- gripping means including at least one grip movable parallel to the longitudinal axis between two adjustable positions situated on opposite sides of said mandrel, and means for securing together and separating the tubular material and said grip.

41. Apparatus according to claim 40, comprising:
an axial support,
at least one of said plates being slidably mounted upon said axial support; and
means for blocking said plate relative to said support.

* * * * *